United States Patent
Hillman et al.

(10) Patent No.: US 11,465,704 B2
(45) Date of Patent: Oct. 11, 2022

(54) ATTACHABLE AND DETACHABLE LIGHT ASSEMBLY FOR AN ELECTRIC POWERED PERSONAL TRANSPORT VEHICLE

(71) Applicant: NEUTRON HOLDINGS, INC., San Francisco, CA (US)

(72) Inventors: Michael D. Hillman, Reno, NV (US); Blair Williams, Cupertino, CA (US); Paul Jackson, Brisbane, CA (US); Matthew J. Cheung, Castro Valley, CA (US); Angus Peart, Emerald Hills, CA (US); Chris Rieger, Brooklfield (AU); John Ulmen, Emerald Hills, CA (US); Brennan Vandenhoek, Newberg, OR (US); Peng Peng, Ithaca, NY (US); Levi Price, Boulder Creek, CA (US)

(73) Assignee: NEUTRON HOLDINGS, INC., San Francisco, CA (US)

(*) Notice: Subject to any disclaimer, the term of this patent is extended or adjusted under 35 U.S.C. 154(b) by 0 days.

(21) Appl. No.: 17/071,531

(22) Filed: Oct. 15, 2020

(65) Prior Publication Data
US 2021/0107582 A1 Apr. 15, 2021

Related U.S. Application Data

(60) Provisional application No. 62/915,476, filed on Oct. 15, 2019.

(51) Int. Cl.
*B60Q 1/14* (2006.01)
*B62J 6/02* (2020.01)
(Continued)

(52) U.S. Cl.
CPC .............. *B62J 6/02* (2013.01); *B60Q 1/1423* (2013.01); *B60Q 1/44* (2013.01); *B62J 6/045* (2020.02);
(Continued)

(58) Field of Classification Search
CPC .... H05B 47/19; H05B 47/105; H05B 17/175; B60Q 1/44; B60Q 1/1423; A63C 17/045;
(Continued)

(56) References Cited

U.S. PATENT DOCUMENTS

| | | |
|---|---|---|
| 10,134,280 B1 | 11/2018 | You |
| 2012/0092886 A1* | 4/2012 | Calhoun ................ A63C 17/26 362/459 |

(Continued)

FOREIGN PATENT DOCUMENTS

WO 2008/090309 A1 7/2008

*Primary Examiner* — Tung X Le
(74) *Attorney, Agent, or Firm* — Dentons US LLP

(57) ABSTRACT

Embodiments of the present disclosure include a wireless remote control or remote control application for controlling the lighting of an electronic personal transportation vehicle. Embodiments can solve problems related to sharing electronic personal transportation vehicles by uniquely identifying a user, and allowing that user to control the lighting of the electronic personal transportation vehicle. In this manner, other users can control the lighting at different times, depending on the specific person that is using the electronic personal transportation vehicle at any given time.

19 Claims, 8 Drawing Sheets

(51) Int. Cl.
*B62J 6/045* (2020.01)
*B60Q 1/44* (2006.01)
*B62K 11/00* (2006.01)
*A63C 17/26* (2006.01)

(52) U.S. Cl.
CPC .............. *B62K 11/00* (2013.01); *A63C 17/26* (2013.01); *B60Q 2300/21* (2013.01); *B60Q 2900/30* (2013.01); *B62K 2202/00* (2013.01)

(58) Field of Classification Search
CPC ....... A63C 17/064; A63C 17/12; A63C 17/26; B62J 6/02; B62J 6/045
See application file for complete search history.

(56) References Cited

U.S. PATENT DOCUMENTS

| | | | |
|---|---|---|---|
| 2013/0039088 A1* | 2/2013 | Khan | F21V 33/008 |
| | | | 362/543 |
| 2013/0214701 A1* | 8/2013 | Forgey, II | G09G 3/16 |
| | | | 315/307 |
| 2014/0090910 A1* | 4/2014 | Treadway | B62K 5/027 |
| | | | 180/65.51 |
| 2016/0195246 A1* | 7/2016 | Carattini | A63C 17/26 |
| | | | 362/486 |
| 2017/0142800 A1 | 5/2017 | Schultheis | |
| 2017/0257934 A1 | 9/2017 | Garvey | |
| 2018/0295706 A1 | 10/2018 | Recker et al. | |
| 2019/0217831 A1 | 7/2019 | Mele | |

* cited by examiner

ATTACHABLE AND DETACHABLE LIGHT ASSEMBLY FOR AN ELECTRIC POWERED PERSONAL TRANSPORT VEHICLE

PRIORITY CLAIM

This application is a non-provisional of U.S. Provisional Application No. 62/915,476, filed Oct. 15, 2019, which is hereby incorporated by reference in its entirety.

FIELD

The present disclosure relates to safety features for an electric powered personal transport vehicle and an electric powered personal transport vehicle comprising the same.

BACKGROUND

People need a better mechanism and supporting system to move around safely without the vulnerabilities of traditional skateboards and scooters. According to the American Academy of orthopedic Surgeons, skateboard accidents account for approximately 70,000 emergency room visits per year; and according to the Pediatric orthopedic Society of North America, scooter accidents account for about 60,000 emergency room visits per year. To avoid injury, riders are encouraged to avoid using these personal transportation vehicles at dawn, dusk or night. Riders are also encouraged to wear reflective clothing or personal lights to increase visibility to automobile drivers.

SUMMARY

Personal transport vehicles are becoming increasing popular a primary means of travel in metropolitan areas such as large cities. Accordingly, there exists a need for a lighting system to increase visibility of personal transport vehicles to automobile drivers, alert riders of the personal transport vehicles to potential dangers on the road, and provide directional guidance to both the rider and others.

Provided herein are some embodiments. In an embodiment, the design is directed to an electric personal transport vehicle and its mobile application. These and other features of the design provided herein can be better understood with reference to the drawings, description, and claims, all of which form the disclosure of this patent application.

According to one aspect, the present disclosure provides an attachable and detachable light assembly for an electric-powered personal transport vehicle. The attachable and detachable light assembly comprises a main housing for storing one or more lights, a circuit board assembly for the one or more lights, and wires and cables extending from the circuit board. The attachable and detachable light assembly further comprising an adapter fittable into the main housing for attaching the attachable and detachable light assembly to the electric-powered personal transport vehicle. The attachable and detachable light assembly further includes a charging port that is integrated into the main housing.

According to another aspect, the present disclosure provides an electric-powered personal transport vehicle comprising a deck to support the weight of a rider. One or more trucks for controlling the axle of the deck; and an attachable and detachable light assembly between the deck and the one or more trucks.

In certain aspects, the present disclosure provides an attachable and detachable front light assembly for providing visibility to the rider. In yet another aspect, the present disclosure provides an attachable and detachable rear riding and brake light assembly to make the rider more visible to others and indicate to others when the rider is braking.

Aspects of the disclosure, further provide an attachable and detachable light assembly to communicate navigational directions and/or cautious road conditions to the rider. Embodiments can allow one or more users to independently control the operation of the light assembly during use, depending on who is using the electric-powered personal transport vehicle.

BRIEF DESCRIPTION OF THE DRAWINGS

The drawings refer to some embodiments of the design provided herein in which.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

Figure 1:
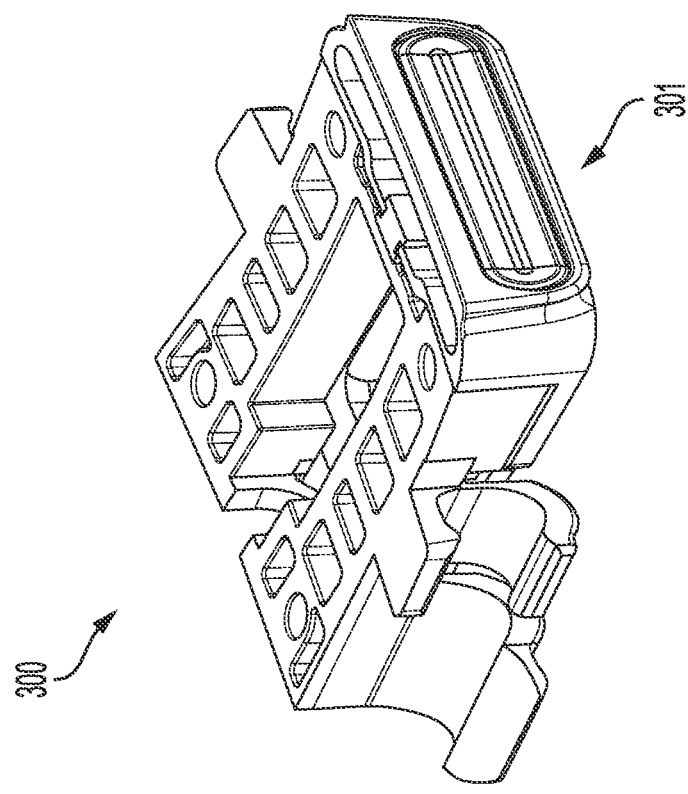
FIG. 1 shows a perspective views of attachable and detachable light assemblies according to some embodiments.
Figure 1:
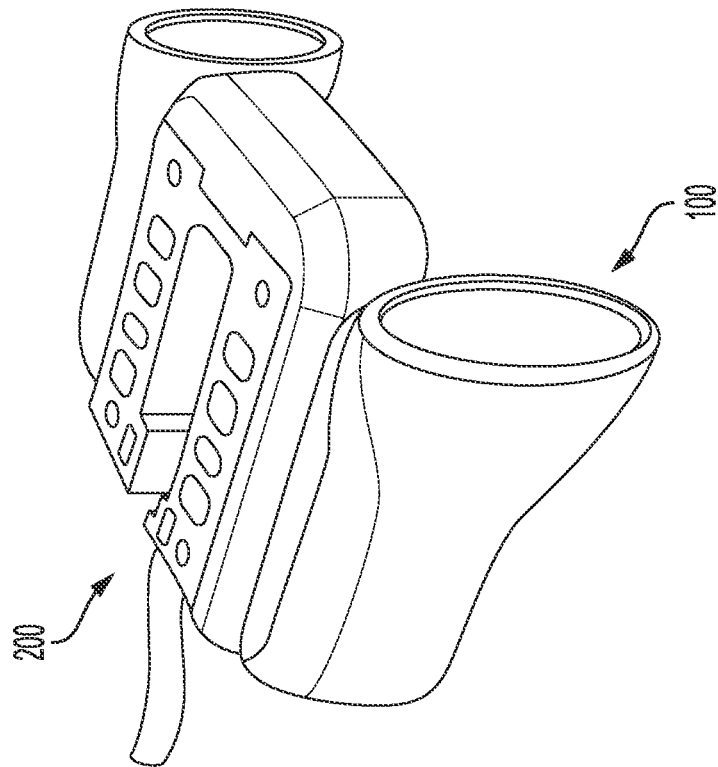
Figure 2:
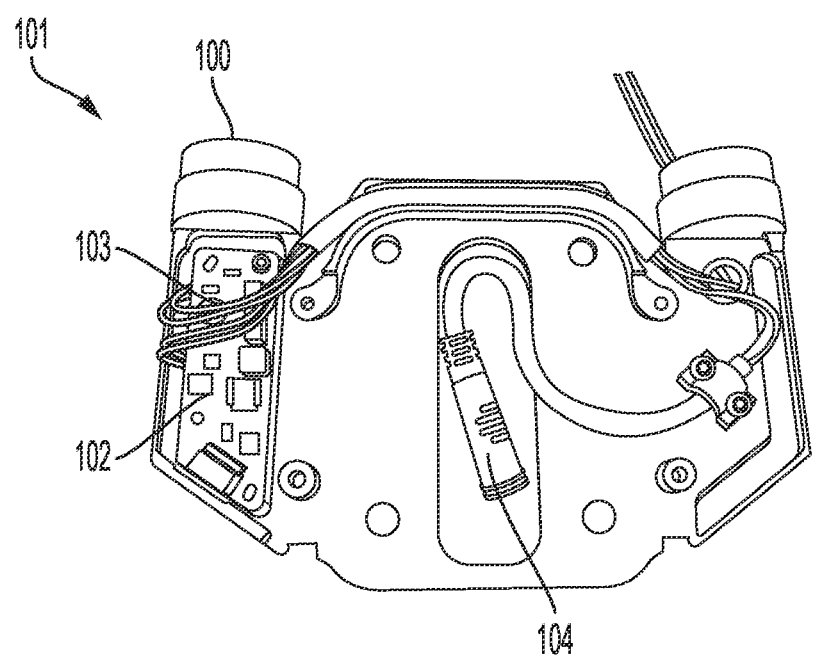
FIG. 2 shows a top view of a main housing of the attachable and detachable light assembly.
Figure 3:
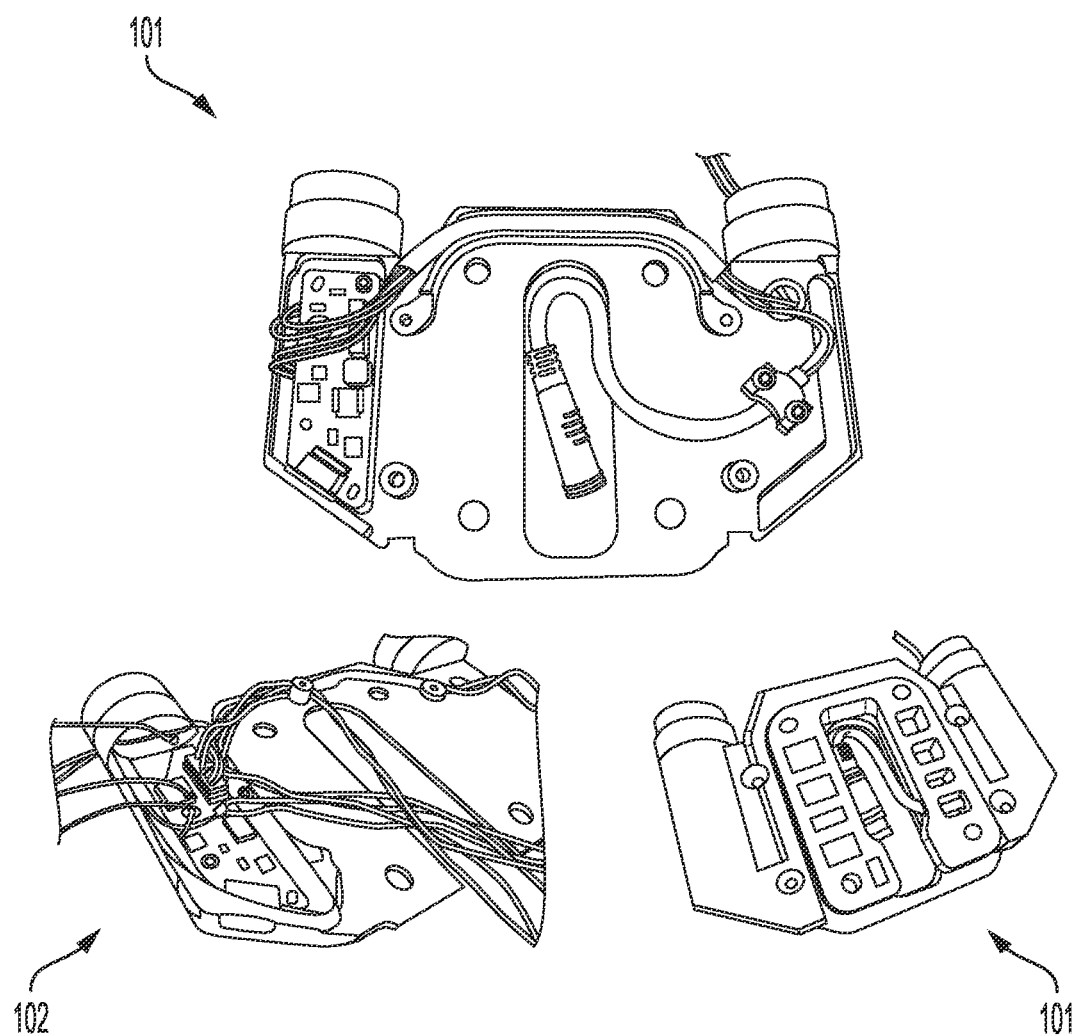
FIG. 3 shows a top and perspective view of a main housing and circuit board assembly of the attachable and detachable light assembly.
Figure 4:
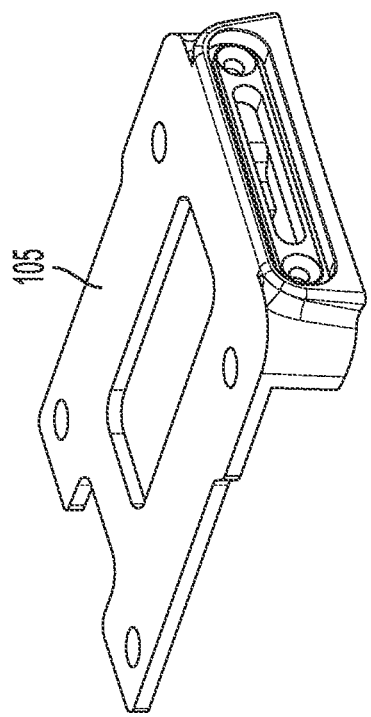
FIG. 4 shows a perspective view of a main housing for the attachable and detachable light assembly.
Figure 4:
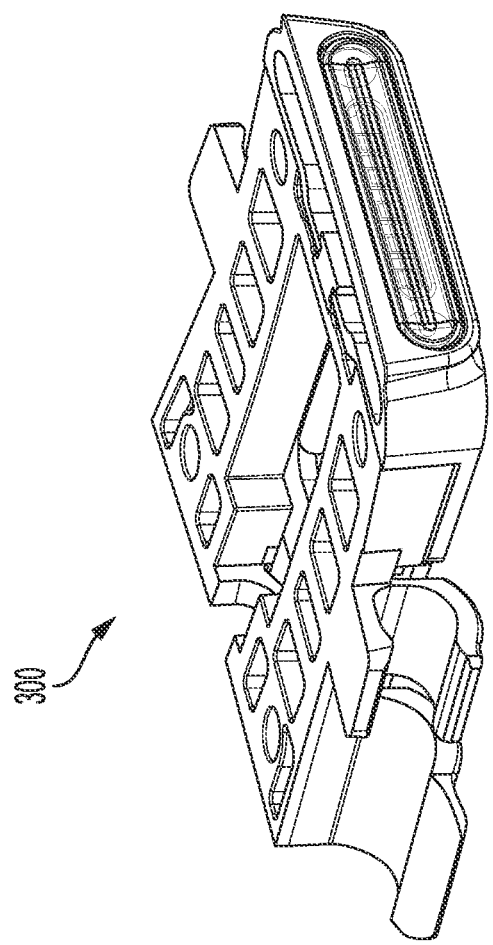

In the following description, numerous specific details are set forth, such as examples of specific data signals, named components, number of wheels in a device, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first electric-powered personal transport vehicle, can be made. However, the specific numeric reference should not be interpreted as a literal sequential order but rather interpreted that the first electric-powered personal transport vehicle is different than a second electric-powered personal transport vehicle. Thus, the specific details set forth are merely example. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

The patents, published applications and scientific literature referred to herein establish the knowledge of those with skill in the art and are hereby incorporated by reference in their entireties to the same extent as if each was specifically and individually indicated to be incorporated by reference. Any conflict between any reference cited herein and the specific teachings of this specification shall be resolved in favor of the latter. Likewise, any conflict between an art-understood definition of a word or phrase and a definition of the word or phrase as specifically taught in this specification shall be resolved in favor of the latter.

As used herein, whether in a transitional phrase or in the body of a claim, the terms "comprise(s)" and "comprising" are to be interpreted as having an open-ended meaning. That is, the terms are to be interpreted synonymously with the phrases "having at least" or "including at least". When used in the context of a method, the term "comprising" means that the method includes at least the recited steps, but may include additional steps. When used in the context of a composition, the term "comprising" means that the composition includes at least the recited features or components, but may also include additional features or components.

The terms "consists essentially of" or "consisting essentially of" have a partially closed meaning, that is, they do not permit inclusion of steps or features or components which would substantially change the essential characteristics of a method or composition; for example, steps or features or components which would significantly interfere with the desired properties of the compounds or compositions described herein, i.e., the method or composition is limited to the specified steps or materials and those which do not materially affect the basic and novel characteristics of the method or composition.

The terms "consists of" and "consists" are closed terminology and allow only for the inclusion of the recited steps or features or components.

As used herein, the singular forms "a," "an" and "the" specifically also encompass the plural forms of the terms to which they refer, unless the content clearly dictates otherwise.

The term "about" is used herein to mean approximately, in the region of, roughly, or around. When the term "about" is used in conjunction with a numerical range, it modifies that range by extending the boundaries above and below the numerical values set forth. In general, the term "about" or "approximately" is used herein to modify a numerical value above and below the stated value by a variance of 20%.

As used herein, the recitation of a numerical range for a variable is intended to convey that the variable can be equal to any values within that range. Thus, for a variable which is inherently discrete, the variable can be equal to any integer value of the numerical range, including the end-points of the range. Similarly, for a variable which is inherently continuous, the variable can be equal to any real value of the numerical range, including the end-points of the range. As an example, a variable which is described as having values between 0 and 2, can be 0, 1 or 2 for variables which are inherently discrete, and can be 0.0, 0.1, 0.01, 0.001, or any other real value for variables which are inherently continuous.

In the specification and claims, the singular forms include plural referents unless the context clearly dictates otherwise. As used herein, unless specifically indicated otherwise, the word "or" is used in the "inclusive" sense of "and/or" and not the "exclusive" sense of "either/or."

The Electric Personal Transport Vehicle Features

The electric personal transport vehicle, such as an electric-powered transport vehicle, such as a skateboard or an electric-powered scooter, has many features and some example features will be discussed below.

In one embodiment, the electric-powered transport vehicle includes a deck, one or more wheels and one or more electric motors mounted to a drive truck. The drive truck rotatably supports each wheel and the electric motor(s) is configured to drive the wheels. The drive truck is mounted to the deck. An electric-powered transport vehicle can further include one or more batteries within one or more enclosures eventually mount to the deck. The deck itself may be the battery enclosure, with no need for a secondary battery enclosure. The one or more batteries supply power to the electric motor or motors, electric light or lights, and other electronic equipment, including various sensors. One or more processors and various software routines are configured to control the operation of the electric motor(s), light (s), sensor(s), etc.

The electric-powered personal transport vehicle may include a deck, and a weight of a rider being supported by the deck, trucks, bearings and wheels. The rider may change the angles of the deck by shifting their weight on the deck and/or via commands given through a wireless remote. Changing the balance of the rider's weight may be used as a control input for steering and/or acceleration and/or braking in combination with the wireless remote.

Referring to FIG. 1, embodiments of the attachable and detachable light assembly include attachable and detachable front riding light assembly (200) and attachable and detachable rear riding and brake light assembly (300).

The attachable and detachable front riding light assembly (200) as well as the attachable and detachable rear riding and brake light assembly (300) and the different parts making up the front light (100), rear light (301) and attachable and detachable light assembly are further depicted in FIGS. 1-4.

The attachable and detachable front riding light assembly (200) as well as the attachable and detachable rear riding and brake light assembly (300) allow an electric-powered board and its use to be seen by oncoming traffic and be safe. The front riding light assembly (300) and the rear riding and brake light assembly (300) may be installed on existing electric-powered skateboards and/or scooters.

Figure 5:
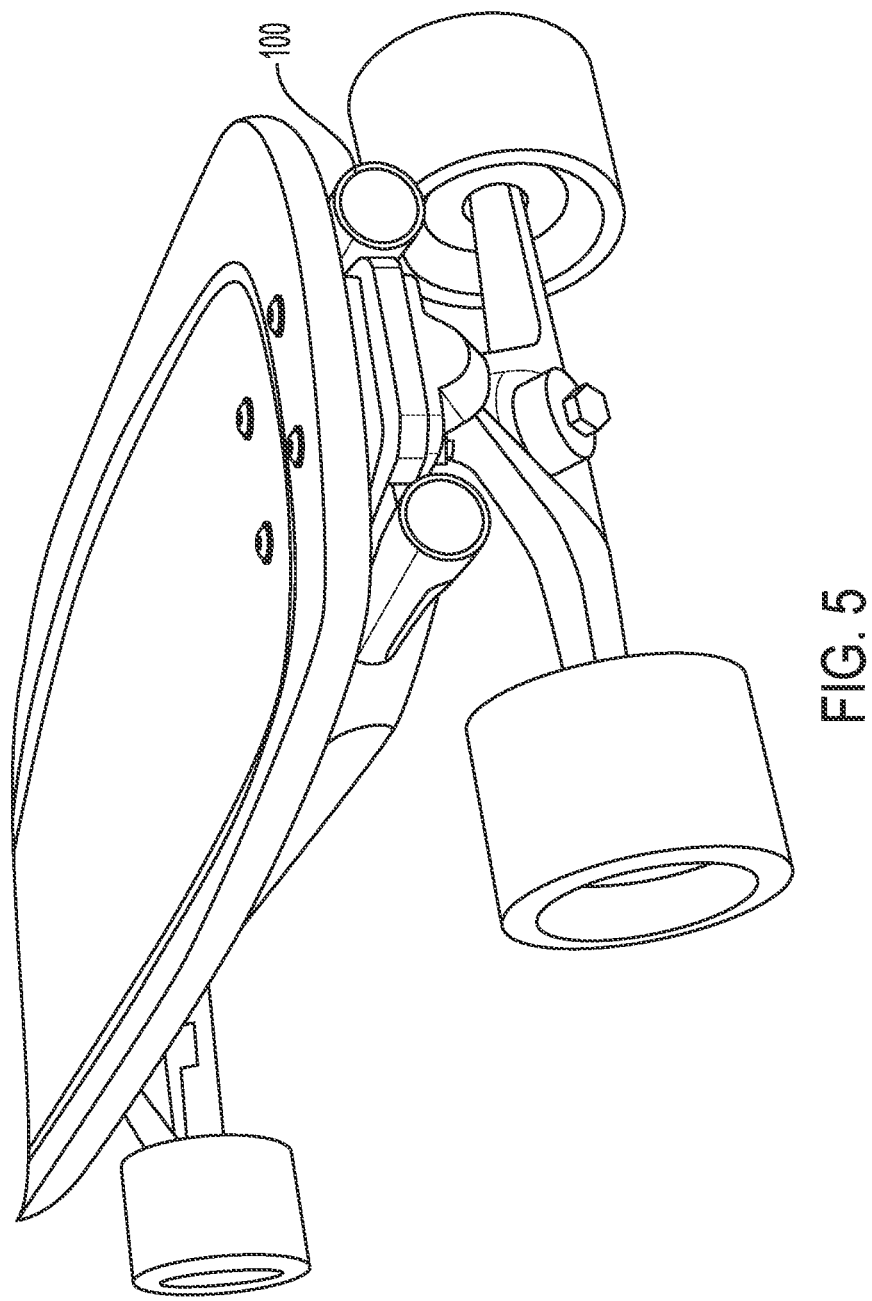
FIG. 5 shows a perspective view of an electric-powered personal transport vehicle comprising the attachable and detachable front light assembly.

Referring to FIG. 5, the front riding lights are designed to illuminate the road ahead, for example, approximately 20 meters in front of the rider. A rider can cover a distance of 20 meters in 2 seconds when riding 35 km/h on the electric-powered board. In some embodiments, the rear riding and brake lights will switch from lower brightness to higher brightness when under braking command from a wireless remote (500), such as the remote shown in FIG. 8.

Figure 8:
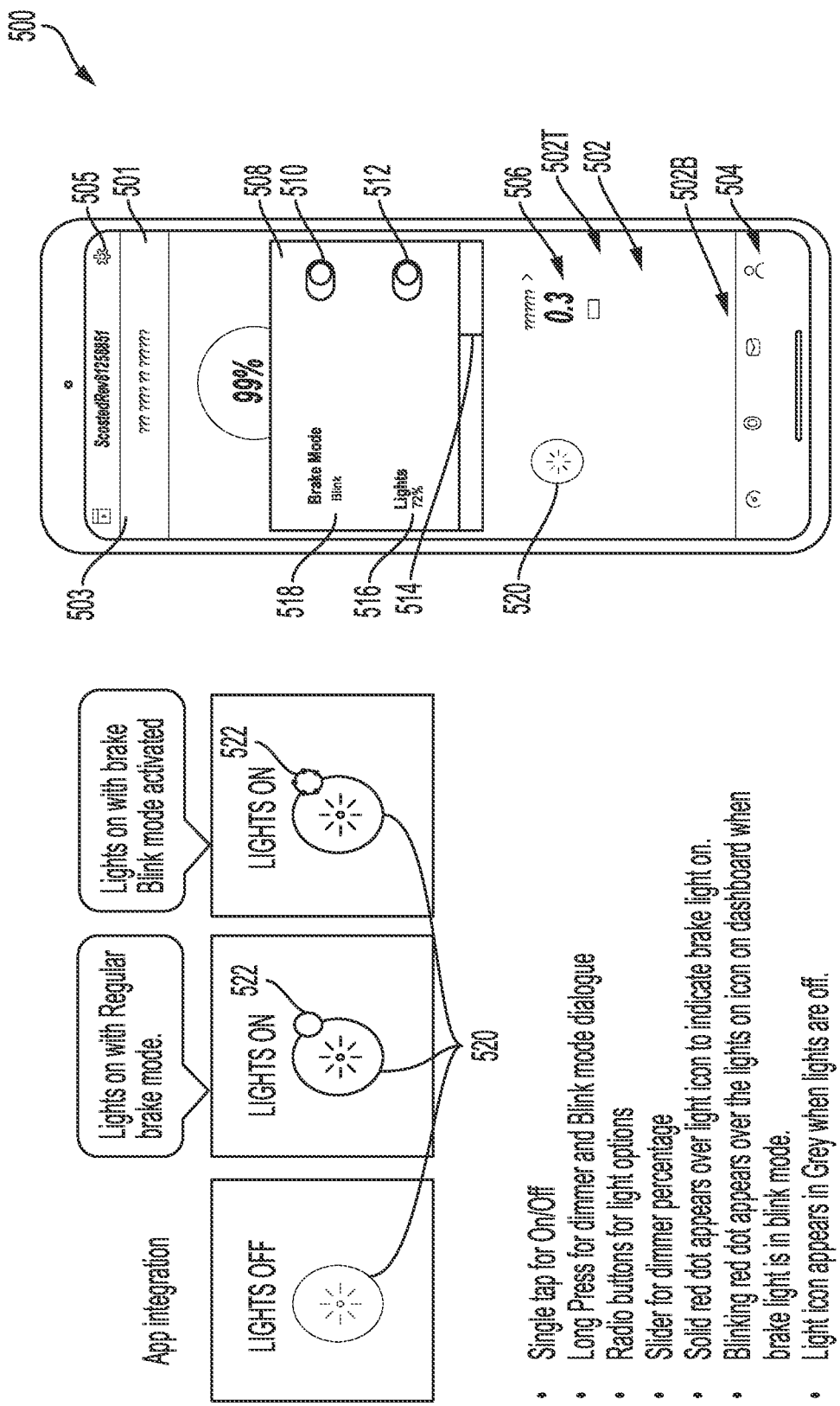
FIG. 8 shows a front view of a wireless remote.

FIG. 8 shows an embodiment of a mobile phone running a mobile application that is programmed to cause the mobile phone to communicate with a vehicle according to this disclosure. In particular, a mobile phone 500 has a touchscreen 501 and runs a mobile application 503. The touchscreen 501 is configured for an input by a user (e.g., a touch) and an output (e.g., a display) to the user. The mobile application 503 can be a native app, a hybrid app, or a web-based app. Note that the mobile phone 500 is illustrative and other mobile devices can be used (e.g., a tablet, a laptop, a wearable, a smartwatch).

The mobile application 503 has a graphical user interface (GUI) 502. When the mobile phone 500 is rotated 90 degrees from a portrait mode, as currently shown in FIG. 8, to be in a landscape mode, then the GUI 502 adjusts accordingly. For example, some screens can be presented identically as shown in FIG. 8 or some screens can be moved to right or left and other screens can be scaled up or scaled down in order to appropriately maintain at least a same or better level of visual presentation in terms of font size, colors, and other visual characteristics.

The GUI 502 presents a top section 502T and a bottom section 502B. The top section 502 borders the bottom section 502B but this can vary where this bordering is avoid due to an intermediate section positioned therebetween. Likewise, the bottom section 502B and the top section 502T can be reversed or moved around. For example, the bottom section 502B can be presented on a top area of the touchscreen 501 when held upright and the top section 502T can be presented a bottom area of the touchscreen 501. Similarly, the bottom section 502T can be presented vertically spanning between the top area and the bottom area of the touchscreen 501 (along vertical height).

The bottom section 502B has a set of graphics 504 (e.g., icons) each configured for an activation by a user input (e.g., a touch) into the touchscreen 501. Each of the graphics 504 can be activated (e.g., by touch) independent of each other and cause the top section 502T to present a corresponding page or screen. As shown in FIG. 8, a leftmost graphic 504 is currently selected and other non-currently selected graphics 504 appear visually distinct (lighter) relative to the leftmost graphic 504 (darker). When these other graphics 504 selected, then the top section 502T presents the corresponding page or screen, as explained above. For example, a graphic 504 to an immediate right of the leftmost graphic 504 causes the top section 502T to present an overhead map (e.g., a navigation map) which can also cause the mobile phone 500 to locate itself (e.g., via an onboard GPS chip, a cell tower triangulation). Likewise, a graphic 504 to an immediate right of this map graphic 504 causes the top section 502T to show a communication screen (e.g., a customer feedback form or open an on-board email program with a prepopulated email address). Similarly, a graphic 504 to an immediate right of this communication graphic 504 causes the top section 502T to show various user profile parameters (e.g., login name, user setting).

The top section 502T can present various corresponding screens or pages based on which of the graphics 504 is selected. As shown in FIG. 8, the top section 502T presents a settings graphic 505, a screen 506, and a screen 508.

The settings graphic 505 is presented in a top left corner, but this location can vary, as needed. Upon selection of the settings graphic 505, the top section 502T presents a settings screen for various settings for the mobile application 503.

The screen 506 presents an odometer section, which is updated in real-time based data from the mobile application 503 or the vehicle, as disclosed herein.

The screen 506 presents a graphic 520. The graphic 520 is presented as a touch button, but other user input elements can be used (e.g., a slider). The graphic 520 is programmed to be activated by touch and then switch between two binary visual states (although more visual states are possible). As shown in FIG. 8, the graphic 520 changes in visual appearance based on what state the graphic 520 is in. When the graphic 520 is activated (e.g., touched) to be in one state (e.g., gray colored although other color schemes are possible), then a head lamp or a tail lamp, as disclosed herein, is off (although can still be powered). When the graphic 520 is activated (e.g., touched) to be in another state (e.g., yellow colored although other color schemes are possible), then the head lamp or the tail lamp, as disclosed herein, is on. This is technologically advantageous because the graphic 520 can be used to quickly turn on and turn off the head lamp or the tail lamp, as disclosed herein.

The screen 508 is presented over the screen 506. As shown in FIG. 8, this presentation is in a middle area of the touchscreen 501, but this presentation can vary. For example, the screen 508 can be presented in the top area or the bottom area. The screen 508 can be presented when the graphic 520 is activated (e.g., touched), i.e., selected to correspond to the head lamp or the tail lamp being turned on (e.g., the graphic 520 is presented as yellow colored).

Once the screen 508 is presented, the screen 508 presents a switch 510, a switch 512, a descriptive indicator 518 (e.g., an updatable text field), a descriptive indicator 516 (e.g., an updatable text field), and a gradual level selector 514 (e.g., a slider, a dial, a knob, a radio button, a dropdown menu). The descriptive indicator 518 and the switch 510 functionally correspond to each other and are visually co-aligned (although this form of presentation can vary). The descriptive indicator 516 and the switch 512 functionally correspond to each other and are visually co-aligned (although this form of presentation can vary). Note that each of the descriptive indicator 516 and the descriptive indicator 518 are descriptively indicate by text, but other forms of descriptive indication are possible (e.g., images). Each of the descriptive indicator 516 and the switch 512 are positioned between the gradual level selector 514 and each of the descriptive indicator 518 and the switch 510. However, note that such positioning can vary. For example, the gradual level selector 514 can be positioned between the switch 510 and the switch 512 or above the switch 510 or along a vertical height of the touchscreen 501 or on the screen 506.

When the user selects the switch 510 (e.g., by touch), then the switch 510 switches between two states (although more states can be added). The first of such states corresponds to a regular brake mode state of the tail lamp. The second of such states corresponds to a brake blink mode state of the tail lamp. The user can switch between such states as the user desires. The descriptive indicator 518 dynamically, responsively, and descriptively indicates what mode for the tail lamp is currently selected in the switch 510. As shown in FIG. 8, the descriptive indicator 518 descriptively indicates that the tail lamp is in the brake blind mode state.

When the user selects the switch 512 (e.g., by touch), then the switch 512 switches between two states (although more states can be added). The first of such states corresponds to an on state of the head lamp. The second of such states corresponds to an off state of the head lamp. The user can switch between such states as the user desires. The gradual level selector 514 is configured to receive a user input for an incremental adjustment (left and right) according to which the mobile application causes the head lamp to incrementally adjust in an illumination property (e.g., brightness, contrast, luminosity, color). As such, the descriptive indicator 516 dynamically, responsively, and descriptively indicates what degree of incremental adjustment is currently selected by the gradual level selector 514. As shown in FIG. 8, the descriptive indicator 516 descriptively indicates that the head lamp is turned on and is 72% bright out 100% of its maximum capacity. This is technologically advantageous because the screen 506 allows the head lamp and the tail lamp to be turned on or turned off or adjusted or controlled independent of each other.

When the graphic 520 is activated (e.g., touched) to be in one state (e.g., gray colored although other color schemes are possible), then a graphic 522 (or another visual content) is not presented over the graphic 520 to indicate that the head lamp or the tail lamp, as disclosed herein, is off (although can still be powered). When the graphic 520 is activated (e.g., touched) to be in another state (e.g., yellow colored although other color schemes are possible) to indicate that the head lamp or the tail lamp, as disclosed herein, is on, then the graphic 522 is presented over the graphic 520. As such, when the switch 510 is in the first state corresponding to the regular brake mode state of the tail lamp, then the graphic 522 is presented in a first visual manner (e.g., solid color filled) over the graphic 520 in the screen 506. However, when the switch 510 is in the second state corresponding to the brake blink mode state of the tail lamp, then the graphic 522 is presented in a second manner visually distinct from the first visual manner (e.g., perimetrically dot patterned) over the graphic 520 in the screen 506. Note that this modes of presentation are illustrative and other modes are possible. For example, the graphic 522 can avoid being presented over the graphic 520. Likewise, whether additional or alternative to the graphic 520 or the graphic 522, there can be a corresponding textual description presented. Regardless, the screen 506 and the screen 508 are technologically advantageous because these presentations enable the user to quickly and independently operate the head lamp and the tail lamp via the GUI 502, while also allowing the user to quickly determine what state each of the head lamp and the tail lamp is currently in.

Figure 6:
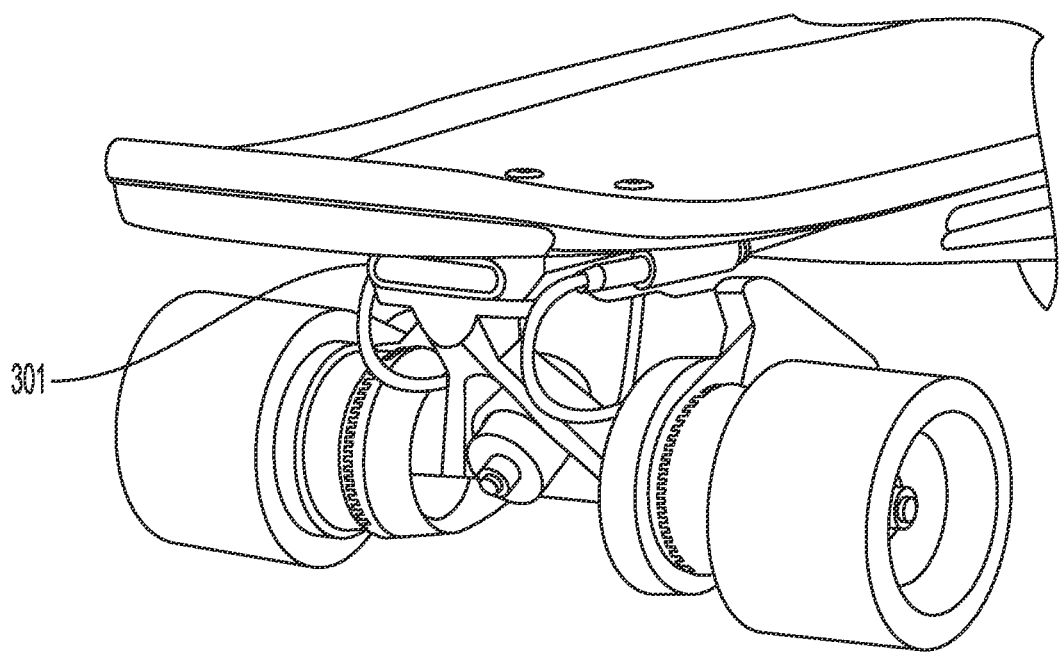
FIG. 6 shows a perspective view of an electric-powered personal transport vehicle comprising the attachable and detachable rear riding and brake light assembly.

Benefits of these embodiments include that different users can control the lighting to suit their own individual needs. This can be helpful in ride-sharing embodiments, in which, for example, a The rear brake lights will activate to go brighter while braking. The rear lights (301) also activate to go brighter when the personal transport vehicle is driven in reverse, in a manner similar to standard behavior on an automobile. An example embodiment of the rear lights (301) is shown in FIG. 6.

The attachable and detachable light assembly is structurally, in mechanical connections and physical dimensions, as well as electrically designed to be installed on an existing electric-powered skateboard and/or scooter.

Figure 7:
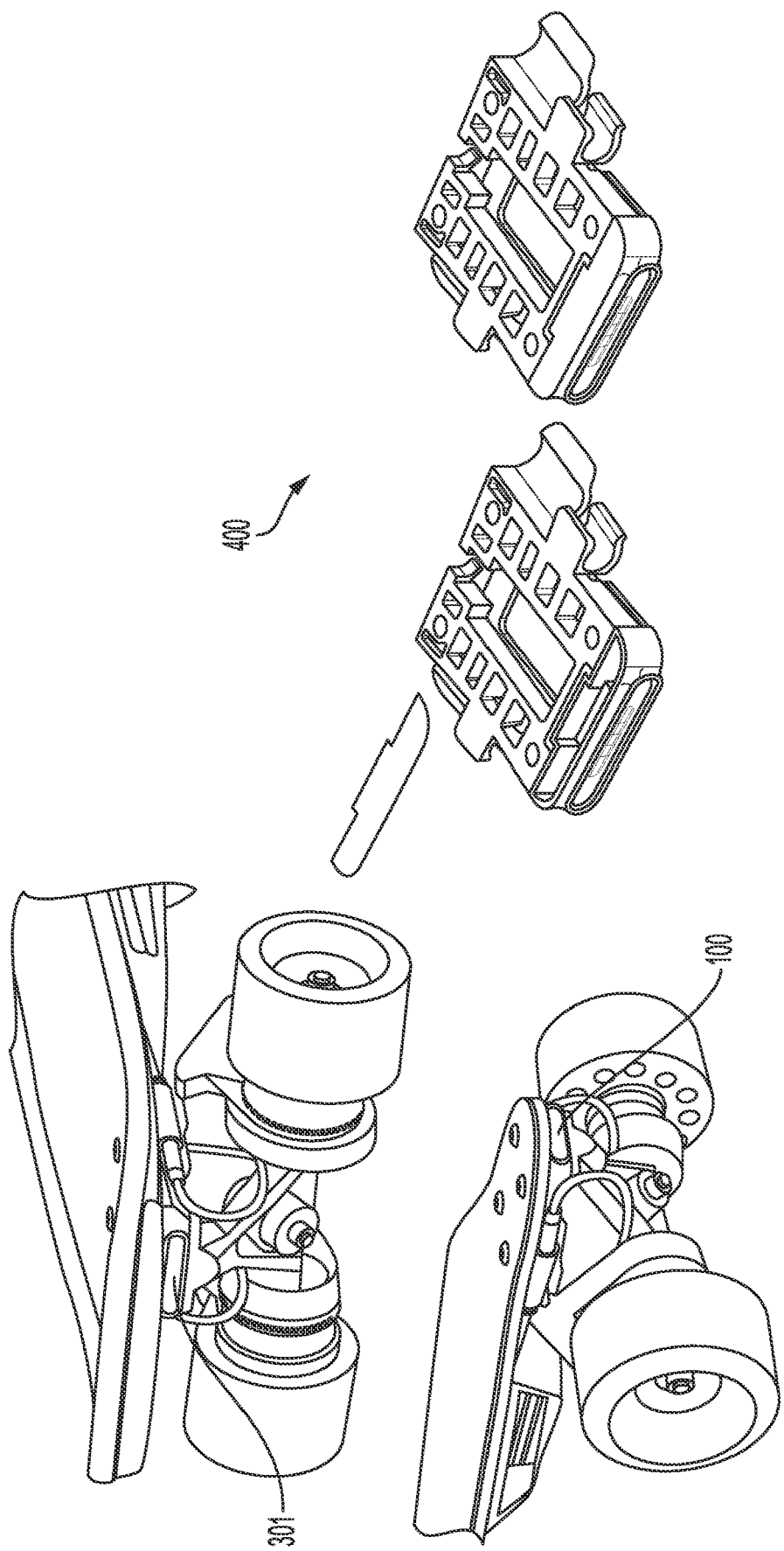
FIG. 7 shows a perspective view of the attachable and detachable light assembly and riser.

FIG. 7 depicts one embodiment. In this embodiment, the attachable and detachable light assembly is installed in between the deck of the personal transport vehicle and the trucks for the personal transport vehicle. In example embodiments, the attachable and detachable light assembly replace the factory installed part called the riser (400). Herein replacing the riser (400) as a factory installed part will be used as an example factory installed part that can be removed and then substitute in the attachable and detachable riding light assembly.

The attachable and detachable front riding light assembly (200) as well as the attachable and detachable rear riding and brake light assembly (300) come in multiple parts that are assembled together. The multiple parts of the attachable and detachable light assembly are designed to mate together with each other to form an integrated combination that matches the size, shape, depth, and mounting screw locations of the original factory installed riser for the electric-powered personal transport vehicle, such as a skateboard or scooter. The main housing (101) contains the front light (100) and the rear light (301) and is made to be identical for every different model of skateboard and scooter that the attachable and detachable front riding light assembly (200) and rear riding and braking light assembly (300) will be installed on. The adapter part (105) is designed and molded to mate with the main housing (101) as well as with the mounting screw locations of the original factory installed riser (400).

The adapter part (105) forms the shape and depth of the original factory installed riser of the particular model of skateboard and scooter that the attachable and detachable light assembly will be installed on when combined with and mated to the standard main housing (101) containing the front light (100) and the rear light (301). Thus, the adapter part (105) comes in a variety of sizes, shapes, and depths, and includes a variety of mounting screw locations. When the adapter part (105) is combined with and mated to the standard main housing (101), they (101 and 105) replace the original factory installed riser (400). The standard main housing (101) comprises a printed circuit board assembly (102) for the lights, the wiring and cabling (103). In an example embodiment, the wiring and cabling (103) connect to the light (100). In one embodiment, the light (100) is light-emitting diode lights (LED), and the main housing (101) comprises an accessory port on a motor driver, and further includes lenses for each light. In example embodiments, the front riding light assembly comprises a screw cap and O-ring containing the lenses for each light within the screw cap, and includes different filters and lenses to give the front riding lights different effects. The screw caps on the front light assembly enables the user to swap out the lenses for easier replacement and parts serviceability.

The main housing (101) is made the same to fit into multiple different models of scooters and/or electrically powered skateboards. Thus, the main housing is made to be common amongst the different models of boards and scooters that the attachable and detachable lights will be installed on.

In some embodiments, the main housing (101) will have multiple mounting screw locations to match up with both the adapter part (105) and the existing board mounting locations of the different models of the electric-powered personal transport vehicle that the attachable and detachable light assembly will be installed on. In an example, the adapter part (105) fits inside the main housing (101) and can have a 'U' shape. The molded adapter part (105) with its cut outs gives some shock absorption and distribution of stresses between the deck where the rider stands and the trucks to which the wheels eventually connect to. Generally, risers are intentionally, geometrically designed to reduce load stresses on the personal transport vehicle. The risers (400) reduce load stresses on the personal transport vehicle deck though the flat surfaces with no cutouts on the top faces of the risers design.

As discussed, the attachable and detachable light assembly may be installed in existing electric-powered personal transport vehicles and/or scooters. In one embodiment, the front riding light assembly (200) has a frame enclosure that has screw holes corresponding to the existing screws/bolts to install and/or remove the trucks near the front of a personal transport vehicle and/or scooter. In another some embodiment, the rear riding and brake light assembly (300) has a frame enclosure that has screw holes corresponding to the existing screws/bolts to install and/or remove the trucks near the front of the skateboard and/or scooter. The attachable and detachable light assembly connects/inserts under the riser (400) in between the board and the truck.

The attachable and detachable light assembly includes a charging port (104) integrated into the main housing. In an example embodiment, the charging port (104) is a DC charging port. In another embodiment, the charging port is an integrated USB-C port can be used to charge the personal transport vehicle remote control, phone, tablets, laptops, and any accessory that follows the USB-C charging standard. The charging port (104) can deliver 15 watts of power, 3 A at 5V from the DC charging/USB-C Port for charging. The USB-C port may also enable power delivery while the personal transport vehicle is in operation, to enable riders to power additional USB powered accessories (such as LED lights, speakers, sensors, etc.) while riding the personal transport vehicle.

The adapter part (105) and/or main housing (101) can be designed with cut outs in the molded parts to decrease weight and aid in fabrication processes to make the thickness and surfaces in those parts easier. The main housing (101) and the adapter part (105) can be made with recessed areas to give space for the cables (103), fasteners, and other assembly features. The recessed areas allow cable (103) to have enough length to be flexible and easy to mate to the accessory port cable(s) going to the communications and power buses of the skateboard and/or scooter. The attachable and detachable light assembly connects to an accessory cable to be powered by the personal transport vehicle's battery and controlled by the personal transport vehicle's battery or motor controller.

The attachable and detachable light assembly has a mating plug coming from the internal printed circuit board that connects to an accessory port coming from the main communication bus of the personal transport vehicle. In one embodiment, the mating plug is included in the attachable and detachable front light assembly (200). In an example embodiment, the attachable and detachable light assembly has an enclosure for the circuit board (102) that fits into and has channels to protectively route wires from the printed circuit board (102) to the connector connecting to the accessory port cable of the personal transport vehicle. In example embodiments, the attachable and detachable light assembly has two or more screws that can screw into the frame to mount a strain relief for the connector connecting to the accessory port cable. In another embodiment, the attachable and detachable light assembly has a grommet and slot built into the frame for a strain relief for the connector connecting to the accessory port cable.

The attachable and detachable front riding light assembly has a mating plug coming from the internal printed circuit board that connects to an accessory port cable on the skateboard and/or scooter in order to connect to a main battery/power supply and a controller of the electric-powered personal transport vehicle to be integrated into the power and control functions of the electric-powered personal transport vehicle. In one embodiment, the attachable and detachable front riding light assembly is a solid unitary assembly so if the lead portion of the housing containing the LED, lenses and screw cap comes in contact with an object on the road. If there is an impact with an object on the road, the force of that impact can be transmitted throughout the frame to reduce a chance of permanently damaging the lead portion of the frame containing the LED and lenses, which is the most exposed portion of this assembly to being damaged. When the front riding light assembly is a solid unitary assembly, the lead portion of the frame containing the LED and lens does not accidently fall off the electric-powered personal transport vehicle once it is installed. In example embodiments, the frame of the attachable and detachable front riding light assembly is made of a durable and light weight material, such as hard-anodized aluminum, so this piece can endure repeated shock and vibration events. The printed circuit board and LED printed circuit board, cables and electrical connections within the attachable and detachable light assembly is potted to make them waterproof and dustproof.

Both front light (100) and rear lights (301) have a variable set of light intensity, duty cycle and pattern settings available through a mobile app for the front and rear lights (100 and 301). For example, the beams may have a brightness of 600 Lumens combined and be dimmed in scalable increments from 0-100% brightness. In example embodiments, the remote (500) can turn a left front light on and off independently of a right front light, like a vehicular signal indicator, and vice versa. In one embodiment, the remote can turn the front light on and off independently of the rear brake lights. The rear riding and brake lights can be put into a specific brake mode to increase their intensity from, for example, 50% nominal lumens and then up to 100% when the electric-powered skateboard and/or scooter is braking. This same behavior applies when the personal transport vehicle is ridden in reverse. Both rear and front lights can also be put into periodic blinking mode to alert traffic approaching that the electric-powered personal transport vehicle is there or for daytime riding.

In one embodiment, the mobile application and/or remote control may have multiple operating modes for the lights. For example, the mobile application and/or remote control includes:

Single tap for on,
Long press for dimmer and blink mode dialogue,
Radio buttons for light options,
Slider to dimmer maximum brightness of front or rear riding lights,
Slider to have the lights automatically power on when the personal transport vehicle is powered on by the user,
Slider to turn on/off the automatic brake and reverse lights functionality on the rear light,
Solid red dot appears over light icon to indicate rear brake light is activated (or not),
Light icon appears in grey when lights are deactivated, and other similar features.

In example embodiments, the electric-powered transport vehicle can include alternative wheels and the different parts making up these wheels.

The alternative wheels to the factory installed wheels are bigger in OD and width, smoother in material and wheel surface, and have a faster top end speed (up to 30 MPH) than a standard factory installed wheel. Thus, the alternative wheels have a same sized core/hub but a tire geometry of about 20-30% larger in outer diameter than a standard factory installed wheel. The alternative wheels can have a wheel diameter between 80 mm and 140 mm. In an example, the wheels have a 105 mm OD. The alternative wheels maximum width was limited by making sure that the board's and/or scooter's stopping distance is within a fixed amount from a top and speed of 30 mph or less. The alternative wheels being wider and having better grip than the factory installed wheels on existing boards and/or scooters will cause the effective gear ratio to be affected, changing brake/acceleration/top speed performance.

Note, the alternative wheels are compatible with existing electric-powered longboard, short board and scooter products. The alternative wheels are compatible with the existing trucks existing longboard products and will not break or significantly damage the trucks, batteries, gears and motors when the alternative wheels are installed and used in operation of the longboard. The alternative wheels when installed are compatible with existing pulleys, belts, motor covers, etc. The alternative wheels are also compatible when the attachable and detachable front and back riding lights accessories are installed.

The alternative wheels are designed to install on boards with existing tall risers installed. The alternative wheels can work with existing tall' risers installed and do not need additional ride height with taller risers than the existing tall' risers installed. For example, the alternative wheels when installed on a board with trucks set to any "normal" tightness, should not be able to wheel bite in turning/leaning conditions. The wheels can provide a similar or same carving performance as existing factory installed urethane wheels.

These wider alternative wheels may attach at the core/hub to the same mounting location as a standard factory installed wheel but supply a significantly different tire for performance for the electric-powered skateboard/scooter. The alternative wheels mechanically attach the wheel at the same mounting points with its core/hub to where the core of the standard wheel connects to the scooter and/or board. The alternative wheels mechanically fit and attach at the mounting points in the same manufacturing footprint as the standard original wheels, just that the wheel or tire portions are bigger and wider and made out of a different material than the standard wheel The alternative wheels are custom-designed with a significant tire material overhang from the core, bump/crack conquering features, with an H-Core matched in size and shape for mating to a standard wheel's core mount to the axle. The alternative wheels mounting connection hardware and mounting locations with the hub/core of the alternative wheels are designed to allow a user to be able to install them with existing skate service tools.

The alternative wheels have selective placement of hollowed cavities within the urethane tire that positively impacts i) the wheel's ability to grip the road, ii) determine how smoothly it rides over cracks and bumps, as well as iii) reduce weight. The alternative wheels have one or more hollowed out channels in the urethane tire around a central core for a smoother ride to slightly deform their shape into the hollowed areas when going over a bump and then rebound back to their original shape after absorbing the impact. The hollowed out channels in the sidewalls of the tires are spaced to at least maintain a minimum wall thickness of the tire in between the channels to give structural strength and stability to the tire. The alternative wheels have hollowed out channels in the sidewalls of the wheel itself in order to make the wheel more compliant and absorb shock by deforming into those hollow areas. In an alternative design, the alternative wheels are molded/manufactured with an internal hollow cavity to allow an air cavity to absorb a little bit of deformation rather than having hollowed out channels coming in from the side of the wheel. When alternative wheels are installed on a board system, they do not significantly increase the overall weight. For example, the alternative wheels are designed with hollowed out channels such that they do not increase weight of the board/scooter by two or more pounds.

The alternative wheels support a stable ride feel due to the wider wheel, better grip, and hollowed areas within the wheel. The balanced flex profile is soft enough to handle road imperfections, yet firm enough to provide all the grip riders need when it matters most. The alternative wheels have a polyurethane (PU) exterior surface in contact with the ground that has a stone ground finish to give that tire's surface superior traction. The stone grinding makes the entire width of the tire flat and in contact with the ground.

The rounded side walls in the alternative wheels urethane tire also allow for easy curb climbing. The alternative wheels have a slightly rounded edge on both sides of the wheel for easy curb climbing. The overhang portion of the wheel has a curved pitch coming from the hub leading to the lip of that overhang. The carved out portion of the overhang allows the overhang portion of the tire to be able to give more than the rest of the solid tire. Therefore, the carved out portion of the overhang gives a little when going over curbs and other big surfaces and when the tire impacts a raised surface at an angle. Thus, when turning or climbing over a curb train track the overhang portion of the tire will normally contact that curb or train track portion first allowing for a little bit of deformation to allow the tire to more easily climb over a bump. The lip of the overhang lip deforms more readily than the rest of the tire when impacting the bump.

The urethane material for the alternative wheels should be selected based on several factors including i) durometer rating, ii) grip to the road, iii) enough hardness to resist some wear. A durometer rating, such as 60 to 80 A durometer urethane, should deliver a smooth ride while still giving enough hardness to give a proper ride feeling. In one embodiment, the alternative wheels have specifications such as:

105 mm diameter,
65 mm width, and
72 A durometer.

The alternative wheels allow existing or new longboard and/or short board and/or scooter owners to more easily tackle rough streets, train tracks, construction zones, bridges and cobblestones, etc. The benefit of the alternative wheels are focused on the smoothness of ride and ability to roll over large cracks and rough terrain while still being able to brake to a stop within normal limits. Generally, the larger diameter of the wheels does reduce acceleration and braking capabilities because the larger diameter of the wheels also increase top end speed of the electric-powered board/scooter. This may be seen as attractive by some customers.

The alternative wheels provide improved shock absorption and smoother ride in on-road riding vibrations (in comparison to existing factory installed urethane wheels. The alternative wheels when installed provides improved stability when riding over bumps, cracks, and loose gravel in on-road riding in comparison to existing factory installed urethane wheels. The alternative wheels when installed provide improved stability and control in off-road riding conditions, on dirt roads and trails in comparison to existing factory installed urethane wheels. In addition, the alternative wheels can provide improved stability/control in water/wet conditions due to the wider wheel and can also come with the option of having tread patterns in various sizes, shapes, and depths across the alternative wheels for dispersing water.

The alternative wheels are designed to allow a user themselves to be able to easily install and be user serviceable with the existing electric-powered skateboards when replacing their factory installed wheels. The alternative wheels can utilize metal pulleys. The alternative wheels can ship with new bearings, pulleys, and belts. In a different embodiment, the alternative wheels are fully compatible with the existing bearings, pulleys, and belts.

The ride mode software has to be upgraded to allow a user to select which wheels are installed on your board (factory installed wheels or the alternative wheels) to aid in preserving ride mode/motor drive characteristics. The alternative wheels when installed are designed with grip and other factors so that the motors on the board still perform within thermal operating range.

The alternative wheels when installed on a board should not reduce traveling range of the battery capacity by no more than 35% of nominal. Range can be reduced from factory installed urethane wheels, due to higher rolling resistance and larger wheel diameter/gear ratio.

In one embodiment, the electric-powered personal transport vehicle is controlled by a wireless remote (500). The wireless remote (500) may be a stand-alone hand-held device or, in an embodiment, a suitably programmed mobile computing device typically running a software application resident on that mobile computing device. In an example embodiment, the mobile computing device may be a smart phone, a smart watch, a tablet computer, etc. The mobile computing device may include a wireless transmitter, such as a radio antenna, for wirelessly communicating with the personal transport vehicle. The wireless remote may use one or more antenna and/or transmission frequency to provide signals to the electric-powered skateboard and/or scooter. Communication may be one way, two way, or networked among multiple devices communicating together with each other and/or with the electric-powered skateboard and/or scooter.

The wireless remote (500) puts the power over the board's operation in the palm of the rider's hand. In one embodiment, the wireless remote is configured to control the acceleration and deceleration of the electric-powered skateboard and/or scooter from a fast or slow acceleration to a quick or gentle braking. In yet another some embodiment, the remote (500) is a high performance, Bluetooth-enabled wireless remote that acts as a safe, secure link between the rider and the board. The remote may or may not use the Bluetooth protocol for transmission. Any variety of wireless transmission protocols may be acceptable for transmission of signals to and from the electric-powered skateboard and/or scooter.

The wireless remote (500) is configured to provide a variable control of the board from a beginning rider to a pro rider. This feature allows riders without riding experience can easily use the electric-powered personal transport vehicle. Multiple ride modes, such as four different pre-programmed modes, make it easier than ever to jump on a board regardless of your skill level. The wireless remote is configured to start in beginner mode, which can up to 11 mph, and can allow a rider work their way up to pro, which tops out at a much higher mph. However, the rider may manually set the mode as well as the on-board processing system may track the rider's habits and dynamically adapt the initial mode the board boots-up into. Both manually and in artificial intelligence enhanced mode, the system can switch between different modes based on riding terrain and rider skill level to maximize range and take full advantage of the board's capabilities. An artificial intelligence program can be configured to record different parameters to figure out a skill level and habits of the rider and then provide customized feedback to the rider of the board for riding on the board. For example, the artificial intelligence program can be configured to change settings on the board for acceleration and deceleration.

Electric lights can be integrated into the personal transport vehicle deck for style, safety, and esthetics. The electric lights are user controllable and can be part of an interactive user interface. Lights of the personal transport vehicle can both communicate the user's intentions to others as well communicate to the rider. The lights are communicatively coupled to the hand held remote to indicate, for example, which way the user intends to turn: left or right. The lights indicate when the user is braking and/or putting the personal transport vehicle in motor into reverse. The lights provide safety at night operating in a low running light mode just to illuminate the presence of the board and its rider. The lights may also illuminate the path the rider is following so the rider can see where they are going in the dark. The lights can be used for navigation purposes to indicate to the rider which way the rider is supposed to be turning when GPS and the navigation app are taking the rider to an address. The lights may communicate a caution or other information to the user when a particular bumping/rough patch of sidewalk/road is coming up. The lights can change color and lighting pattern to convey different types of information. The user can customize the esthetics—color and lighting of their board. The customization can occur through physical application of different filters, setting changes of lights with multiple brightness or color settings through the wireless remote, or through an application on a smart device connected wirelessly or physically to the board.

The electrical lights may be powered through one of the access ports in the motor driver unit. A power line connects to the access port in the motor driver unit. The lights may also be powered directly from the battery's main power and communication bus.

A user may activate the electrical lights on the deck using the wireless handheld remote. The user can also change light operation modes by use of the handheld remote (changing to blinking mode or changing lights brightness). In addition, the lights can also be activated automatically by i) an impulse from the motor driver when signaling braking lights, or ii) sensing a shift in weight/command from the remote to turn left or right by the rider. In addition, the lights on the board as well as in the remote can also be activated by the on-board navigation system to indicate which way to turn to the user, etc. Also, a signal can be sent by an ambient light sensor to either increase or decrease an amount of lumens the lights need to emit depending on whether the ambient light sensor detects whether it is currently daytime, nighttime, or dusk. The lights may be controlled automatically by the vehicle's electrical system sensing changes in motion either through changes in motor or wheel speed, acceleration, or other sensor inputs. Via connectivity to the internet by means of a Bluetooth connection through the personal transport vehicle, the lights can automatically turn on or off based on the sunset/sunrise times of the location at which the personal transport vehicle is present, as detected by GPS coordinates.

Network

A number of electronic systems and devices can communicate with each other in a network environment. The mobile app for the electric-powered personal transport vehicle can put the user on their vehicle in touch with a cloud platform for the electric-powered personal transport vehicle. The network environment has a communications network. The network can include one or more networks selected from an optical network, a cellular network, the Internet, a Local Area Network ("LAN"), a Wide Area Network ("WAN"), a satellite network, a fiber network, a cable network, and combinations thereof. In some embodiments, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls to protect data integrity.

The at least one or more client computing systems can be selected from a first mobile computing device (e.g., smartphone with an Android-based operating system), a second mobile computing device (e.g., smartphone with an iOS-based operating system), a first wearable electronic device (e.g., a smartwatch), a first portable computer (e.g., laptop computer), a third mobile computing device or second portable computer (e.g., tablet with an Android- or iOS-based operating system), a first electric personal transport vehicle, a second electric personal transport vehicle, and the like. The client computing system can include, for example, the software application or the hardware-based system in which may be able exchange communications with the first electric personal transport vehicle, and/or the second electric personal transport vehicle. Each of the one or more client computing systems can have one or more firewalls to protect data integrity.

It should be appreciated that the use of the terms "client computing system" and "server computing system" is intended to indicate the system that generally initiates a communication and the system that generally responds to the communication. For example, a client computing system can generally initiate a communication and a server computing system generally responds to the communication. No hierarchy is implied unless explicitly stated. Both functions can be in a single communicating system or device, in which case, the client-server and server-client relationship can be viewed as peer-to-peer. Thus, if the first portable computer (e.g., the client computing system) and the server computing system can both initiate and respond to communications, their communications can be viewed as peer-to-peer. Additionally, the server computing systems include circuitry and software enabling communication with each other across the network.

Any one or more of the server computing systems can be a cloud provider. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In some embodiments, a server computing system can be configured to display information in a window, a web page, or the like. An application including any program modules, applications, services, processes, and other similar software executable when executed on, for example, the server computing system, can cause the server computing system to display windows and user interface screens in a portion of a display screen space. With respect to a web page, for example, a user via a browser on the client computing system can interact with the web page, and then supply input to the query/fields and/or service presented by the user interface screens. The web page can be served by a web server, for example, the server computing system, on any Hypertext Markup Language ("HTML") or Wireless Access Protocol ("WAP") enabled client computing system (e.g., the client computing system) or any equivalent thereof. The client computing system can host a browser and/or a specific application to interact with the server computing system. Each application has a code scripted to perform the functions that the software component is coded to carry out such as presenting fields to take details of desired information. Algorithms, routines, and engines within, for example, the server computing system can take the information from the presenting fields and put that information into an appropriate storage medium such as a database (e.g., database). A comparison wizard can be scripted to refer to a database and make use of such data. The applications may be hosted on, for example, the server computing system and served to the specific application or browser of, for example, the client computing system. The applications then serve windows or pages that allow entry of details.

Computing Systems

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device. Transitory media such as wireless channels are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application may be resident on the computing device and stored in the memory.

It should be noted that the present design can be carried out on a computing system. However, the present design can be carried out on a server, a computing device devoted to message handling, or on a distributed system in which different portions of the present design are carried out on different parts of the distributed computing system.

Another device that may be coupled to a bus is a power supply such as a DC power supply (e.g., battery) or an AC adapter circuit. As discussed above, the DC power supply may be a battery, a fuel cell, or similar DC power source that needs to be recharged on a periodic basis. A wireless communication module can employ a Wireless Application Protocol to establish a wireless communication channel. The wireless communication module can implement a wireless networking standard.

In some embodiments, software used to facilitate algorithms discussed herein can be embodied onto a non-transitory machine-readable medium. A machine-readable medium includes any mechanism that stores information in a form readable by a machine (e.g., a computer). For example, a non-transitory machine-readable medium can include read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C++, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices. A module may be an electronic hardware circuit, a software coded block of functionality, and/or a combination of electronic hardware circuitry working with a software coded block of functionality for that module.

Many functions performed by electronic hardware components can be duplicated by software emulation. Thus, a software program written to accomplish those same functions can emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

Any numbers expressing quantities are to be understood as being modified in all instances by the term "about." Notwithstanding that the numerical ranges and parameters setting forth, the broad scope of the subject matter presented herein are approximations, the numerical value set forth are indicated as precisely as possible. Any numerical value, however, may inherently contain certain error or inaccuracies as evident from the standard deviation found in their respective measurement techniques. None of the features recited herein should be interpreted as invoking 35 U.S.C. § 112(f) unless the term "means" is explicitly used.

Although the present invention has been described in connection with example embodiments thereof, it will be appreciated by those skilled in the art that additions, deletions, modifications, and substitutions not specifically described may be made without departing from the spirit and scope of the disclosure.

We claim:

1. A system comprising:
   a scooter including a battery, a processor, a network interlace, and at least one of a head lamp or a tail lamp, wherein the battery powers the processor, the network interface, and the at least one of the head lamp or the tail lamp, wherein the processor is in communication with the network interface and the at least one of the head lamp or the tail lamp; and
   a mobile application programmed to (a) run on a mobile device, (b) receive a user input while running on the mobile device, (c) generate an instruction based on the user input while running on the mobile device, and (d) cause the mobile device to transmit the instruction to the network interface while running on the mobile device such that the processor controls the at least one of the head lamp or the tail lamp based on the instruction;
   wherein the mobile application has a graphical user interface presenting a first visual content and a second visual content, wherein the first visual content changes in visual appearance based on the at least one of the head lamp or the tail lamp switching between a first mode or a second mode, wherein the second visual content changes in visual appearance based on the tail lamp switching between a non-blinking mode and a blinking mode, wherein the second visual content overlaps the first visual content.

2. The system of claim 1, wherein the processor is in communication with the head lamp.

3. The system of claim 1, wherein the processor is in communication with the tail lamp.

4. The system of claim 1, wherein the scooter includes a deck and a wheel, wherein the wheel supports the deck, wherein the at least one of the head lamp or the tail lamp is positioned between the deck and the wheel.

5. The system of claim 1, wherein the instruction causes the processor to incrementally adjust an illumination property of the at least one of the head lamp or the tail lamp.

6. The system of claim 1, wherein the head lamp includes a first directional light source and a second directional light source, wherein the instruction causes the processor to control the first directional light source independent of the second directional light source.

7. The system of claim 1, wherein the instruction causes the processor to control the head lamp independent of the tail lamp.

8. The system of claim 1, wherein the instruction causes the processor to control the tail lamp such that the tail lamp changes an illumination intensity from a first level to a second level based on the scooter braking.

9. The system of claim 1, wherein the instruction causes the processor to control the tail lamp such that the tail lamp changes an illumination intensity from a first level to a second level based on the scooter moving in reverse.

10. The system of claim 1, wherein the instruction causes the processor to place the at least one of the head lamp or the tail lamp into a blinking mode.

11. The system of claim 1, wherein the user input is a single touch input, wherein the instruction causes the processor to turn on or to turn off the at least one of the head lamp or the tail lamp.

12. The system of claim 1, wherein the instruction causes the processor to turn on the head lamp and the tail lamp when the scooter is powered on.

13. The system of claim 1, wherein the mobile device is a phone.

14. The system of claim 1, wherein the mobile device is a watch.

15. The system of claim 1, wherein the network interface and the mobile device communicate with each other over a wireless personal area network.

16. The system of claim 1, wherein the network interface and the mobile device communicate with each over at least one of a local area network or a wide area network.

17. The system of claim 1, wherein the network interface is a port on the scooter, wherein the mobile application is programmed to cause the mobile device to transmit the instruction to the network interface while running on the mobile device when the scooter and the mobile device communicate with each other over a cable plugged into the port and into the mobile device.

18. A method comprising:
   controlling a scooter including a battery, a processor, a network interface, and at least one of a head lamp or a tail lamp, wherein the battery powers the processor, the network interface, and the at least one of the head lamp or the tail lamp, wherein the processor is in communication with the network interface and the at least one of the head lamp or the tail lamp; and
   running a mobile application on a mobile device such that the mobile application (a) receives a user input while running on the mobile device, (b) generates an instruction based on the user input while running on the mobile device, and (c) causes the mobile device to transmit the instruction to the network interface while running on the mobile device such that the processor controls the at least one of the head lamp or the tail lamp based on the instruction;
   wherein the mobile application has a graphical user interface presenting a first visual content and a second visual content, wherein the first visual content changes in visual appearance based on the at least one of the head lamp or the tail lamp switching between a first mode or a second mode, wherein the second visual content changes in visual appearance based on the tail lamp switching between a non-blinking mode and a blinking mode, wherein the second visual content overlaps the first visual content.

19. A memory storing a mobile application programmed to:
  cause a mobile device to communicate with a scooter including a battery, a processor, a network interface, and at least one of a head lamp or a tail lamp, wherein the battery powers the processor, the network interface, and the at least one of the head lamp or the tail lamp, wherein the processor is in communication with the network interface and the at least one of the head lamp or the tail lamp;
  receive a user input;
  generate an instruction based on the user input, and
  cause the mobile device to transmit the instruction to the network interface such that the processor controls the at least one of the head lamp or the tail lamp based on the instruction;
  wherein the mobile application has a graphical user interface presenting a first visual content and a second visual content, wherein the first visual content changes in visual appearance based on the at least one of the bead lamp or the tail lamp switching between a first mode or a second mode, wherein the second visual content chances in visual appearance based on the tail lamp switching between a non-blinking mode and a blinking mode, wherein the second visual content overlaps the first visual content.

* * * * *